UNITED STATES PATENT OFFICE.

OTTO MARCSCH, OF BERLIN, GERMANY.

PREPARING MEDICATED CONFECTIONERY.

SPECIFICATION forming part of Letters Patent No. 586,504, dated July 13, 1897.

Application filed July 6, 1896. Serial No. 598,208. (Specimens.)

*To all whom it may concern:*

Be it known that I, OTTO MARCSCH, a subject of the Emperor of Austria-Hungary, and a resident of Berlin, in the Kingdom of Prussia, German Empire, have invented a certain new and useful Improved Medical Confectionery, of which the following is a full, clear, and exact description.

The present invention consists of a process for producing medical chocolate and confectionery in which the unpleasant taste of the medicine is entirely avoided, without, however, impairing the efficacy of the said medicine. Hitherto attempts have been made to mask the unpleasant taste of certain medicines by incasing the same in gelatin or chocolate capsules or crusts in the same manner in which many kinds of sweets are filled with pleasant-tasting liquor. This process, however, in no way prevents the unpleasant taste from becoming noticeable as soon as the casing or crust has been broken, in the case of chocolate incrustations, while in the case of gelatin capsules many people cannot even swallow them and find the gelatin approximately as unpleasant as the medicine itself.

The process forming the object of the present invention, consisting in practically combining the medicine with the chocolate in finely-divided form, comprises as its main characteristic feature the particular means employed for suddenly inclosing each finely-divided particle separately in a capsule of chocolate or cocoa mass or sugar, and this is attained by suddenly cooling the emulsion, advantageously by adding to the same a few drops of cold water.

In carrying the process into practice a suitable dose of the medicine is mixed with a corresponding desirable quantity of sweetened or unsweetened cocoa mass and crushed in a chocolate-mill until the medicine is intimately mixed in finely-divided form with the cocoa mass. In order to prevent the molecules of the medicine from again concentrating, the whole mass is emulsified, being continually agitated during the emulsification, and then suddenly hardened by being suddenly cooled. The sudden cooling may be effected in any known manner; but it is advantageously accomplished by pouring a few drops of cold water into the mass while it is being mixed.

Sugar mixtures or sugar solution, such as that known as "fondant," may be employed instead of cocoa mass.

The product obtained by the above-mentioned process may be brought into suitable form for the market by any known method.

I claim as my invention—

A process for producing medicinal confectionery which consists in mixing the medicine with a quantity of cocoa mass, grinding the same in a chocolate-mill, emulsifying the result and suddenly cooling by introducing a few drops of cold water into the mass substantially as described.

In witness whereof I have hereunto set my hand in presence of two witnesses.

OTTO MARCSCH.

Witnesses:
W. HAUPT,
HENRY HASPER.